(12) United States Patent  
Tangemann

(10) Patent No.: US 6,636,495 B1  
(45) Date of Patent: Oct. 21, 2003

(54) DIVERSITY TRANSMISSION IN A MOBILE RADIO SYSTEM

(75) Inventor: Michael Tangemann, Leonberg (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/353,354

(22) Filed: Jul. 15, 1999

(30) Foreign Application Priority Data

Jun. 24, 1999 (EP) .............................................. 99440159

(51) Int. Cl.$^7$ ................................................. H04Q 7/00
(52) U.S. Cl. ...................... 370/334; 370/335; 370/332; 375/299; 455/562.1; 455/561
(58) Field of Search .................................. 455/101, 102, 455/103, 561, 562, 403, 418, 428, 562.1, 137; 375/293, 299, 312; 370/334, 335, 332

(56) References Cited

U.S. PATENT DOCUMENTS

| | | | |
|---|---|---|---|
| 5,652,764 A | | 7/1997 | Kanzaki et al. |
| 6,151,310 A | * | 11/2000 | Dent ........................... 370/330 |
| 6,205,127 B1 | * | 3/2001 | Ramesh ....................... 370/329 |
| 6,212,242 B1 | * | 4/2001 | Smith et al. .................. 375/132 |
| 6,243,565 B1 | * | 6/2001 | Smith et al. .................. 375/299 |
| 6,415,163 B1 | * | 7/2002 | Keskitalo et al. ............ 455/562 |

FOREIGN PATENT DOCUMENTS

| | | |
|---|---|---|
| EP | 0 807 989 A1 | 11/1997 |
| EP | 0 923 203 A2 | 6/1999 |
| WO | WO 98/28861 | 7/1998 |

OTHER PUBLICATIONS

"UTRA FDD; Physical layer procedures" 3GPP (Third Generation Partnership Project) RAN S1.14 v2.0.0 (Apr. 1990).

* cited by examiner

Primary Examiner—William Trost  
Assistant Examiner—Congvan Tran  
(74) Attorney, Agent, or Firm—Sughrue Mion, PLLC

(57) ABSTRACT

In a known diversity transmission method, two signals with different identifications are transmitted via two spaced antennas. To be able to apply the diversity principle to more than two antennas, a novel method and a novel base station are proposed. The novel base station comprises two transmitting apparatuses and an assignment apparatus connected thereto which establish connections between each of the two transmitting apparatuses and each of the antennas. The base station further comprises a computing and control apparatus that is connected to the assignment apparatus, which divides the antennas into a first antenna group and a second antenna group, and controls the switching of the connections in such a way that the first antenna group is connected to the first transmitting apparatus, and the second antenna group to the second transmitting apparatus. By several different divisions of the antennas into a first antenna group and a second antenna group, the amplitude and phase differences (phi) existing between the signals at the receiver can be compensated for even if more than two antennas are used. It is also possible to determine that grouping of the antennas with which the highest diversity gain is achieved.

18 Claims, 3 Drawing Sheets

DIVERSITY TRANSMISSION IN A MOBILE RADIO SYSTEM

This invention relates to a diversity transmission method and a base station for a mobile radio system for carrying out the method.

In a document entitled "UTRA FDD; Physical layer procedures" and designated "3GPP PAN S1.14 V2.0.0", which was published by the standardization organization 3GPP (Third Generation Partnership Project) in April 1999 within the scope of the standardization of the future mobile radio system UMTS (universal mobile telecommunications system), and which can be accessed in the Internet at the home page "http://www.3gpp.org", a diversity transmission method for a mobile radio system and a base station for carrying out the method are described. In Chapter 8 on pages 23 to 25, entitled "Feedback mode transmit diversity", a base station is described which transmits a first signal and a second signal via two spaced antennas. The signals differ in their pilot sequences, i.e., in their identifications, which are used to mark the two antenna paths and, thus, the two radio transmission paths. Thus, at the receiving location, an amplitude difference and a phase difference between the two signals can be determined. The mobile station at the receiving location sends a feedback signal to the base station to indicate the values of the existing amplitude and phase differences, so that the amplitude and phase can be corrected at the transmitting location. Since only a single feedback signal is transmitted, correction is only possible between two antennas. It is desirable, however, to provide a diversity transmission method for more than two antennas and to propose a base station for carrying out the method.

U.S. Pat. No. 5,652,764 discloses a mobile communication system in which a base station transmits radio signals via two spaced antennas by the diversity technique. A transmission signal is spread through two different orthogonal codes to produce two different spread signals, which are then transmitted via the two spaced antennas. The mobile station receiving these signals can identify the signals by the codes. The codes are thus identifications; they are generated in the base station by two transmitting means provided with code generators. Accordingly, the base station described in that U.S. Patent includes a first transmitting means and a second transmitting means which form from a transmission signal a first signal with a first identification and a second signal with a second identification. The mobile station, which can distinguish the two signals from one another by the different identifications, can also determine an amplitude difference and a phase difference existing between the two signals at the receiver. On reception, a constructive combination of the two signals provides a diversity gain, which increases as the amplitude and phase difference decreases. The prior-art diversity transmission method is carried out using two spaced antennas. It is desirable, however, to apply the method to more than two antennas, particularly to antenna arrays and phased arrays.

It is therefore an object of the invention to provide a diversity transmission method for more than two antennas and a base station for carrying out this method.

This object is attained by a diversity transmission method with the features of claim 1 and by a base station with the features of claim 7.

Accordingly, use is made of more than two antennas, the antennas being divided into a first antenna group and a second antenna group in a first step, and the first signal being transmitted via the first antenna group and the second signal via the second antenna group in a second step. In a later step, a new first antenna group and a new second antenna group are formed at least once, and the second step is then repeated. By these measures, the diversity transmission method is applied to several antenna groups each comprising part of the more than two antennas, with two antenna groups being formed several times using different groupings of the antennas, and the process being cycled through several times. As a result, a different amplitude difference and/or phase difference to be corrected appears with each cycle. Through the cyclic repetition of the process, a high diversity gain can be achieved in a simple manner if more than two antennas are used.

The base station according to the invention is characterized in that it is connected to more than two antennas, that it comprises assignment means for assigning each of the antennas to either of the two transmitting means, and that it further comprises computing and control means which are connected to the assignment means, divide the antennas into a first antenna group and a second antenna group, and control the assignment in such a manner that the first antenna group and the second antenna group are connected to the first transmitting means and the second transmitting means, respectively.

Further advantageous features of the invention are defined in the subclaims.

Particularly advantageously, in a third step, the first and second signals are received and an amplitude difference and/or a phase difference existing between the two signals at the receiving location are determined, and in a next step, this amplitude difference and/or this phase difference are communicated to the transmitting location, where the amplitude and/or the phase position are changed for one of the two antenna groups. The base station transmitting the signals thus receives from the mobile station a correction signal which indicates the amplitude difference and/or phase difference existing at the receiver. The base station uses this correction signal to correct the amplitude and/or the phase position, so that the signals arrive at the receiver with equal strengths and in phase and can be constructively combined in order to achieve a high diversity gain.

In this connection it is particularly advantageous to change the amplitude and/or the phase position for one of the two antenna groups by complex weighting of those signals which are transmitted via this antenna group.

If M antennas are used, where M is a power of two, it is particularly advantageous if for the grouping of the M antennas, a Walsh-Hadamard matrix consisting of M×M elements is formed, each of whose M columns is assigned to one of the M antennas, and of whose M rows, those M−1 rows which follow the first row each indicate an assignment of the antennas to one of the two antenna groups. By the formation of this matrix, a total of M−1 possible different groupings are calculated in a simple manner, each of which can be used for one cycle of the process for dividing the antennas into the antenna groups. With these M−1 possible groupings, the M antennas can be adjusted relative to each other nearly optimally, since the Walsh-Hadamard matrix provides exactly M−1 orthogonal associations.

It is also particularly advantageous if the method is carried out in a base station which is connected to an antenna array formed from the more than two antennas, and if the base station includes complex weighting stages which are connected to computing and control means and which change the amplitudes and phases of the signals transmitted via the antenna array in response to control signals provided by the computing and control means. A base station so equipped is especially suited for carrying out the diversity transmission method according to the invention on the space or polarization diversity principle.

In this connection it is particularly advantageous to implement the antenna group as a phased array. This makes it possible to carry out the diversity transmission method within an SDMA radio transmission (SDMA=space diversion multiple access) and to serve a large number of users simultaneously by reuse of radio resources.

The invention and further advantages arising therefrom will now be described in more detail with reference to the accompanying drawings, in which.

Figure 1:
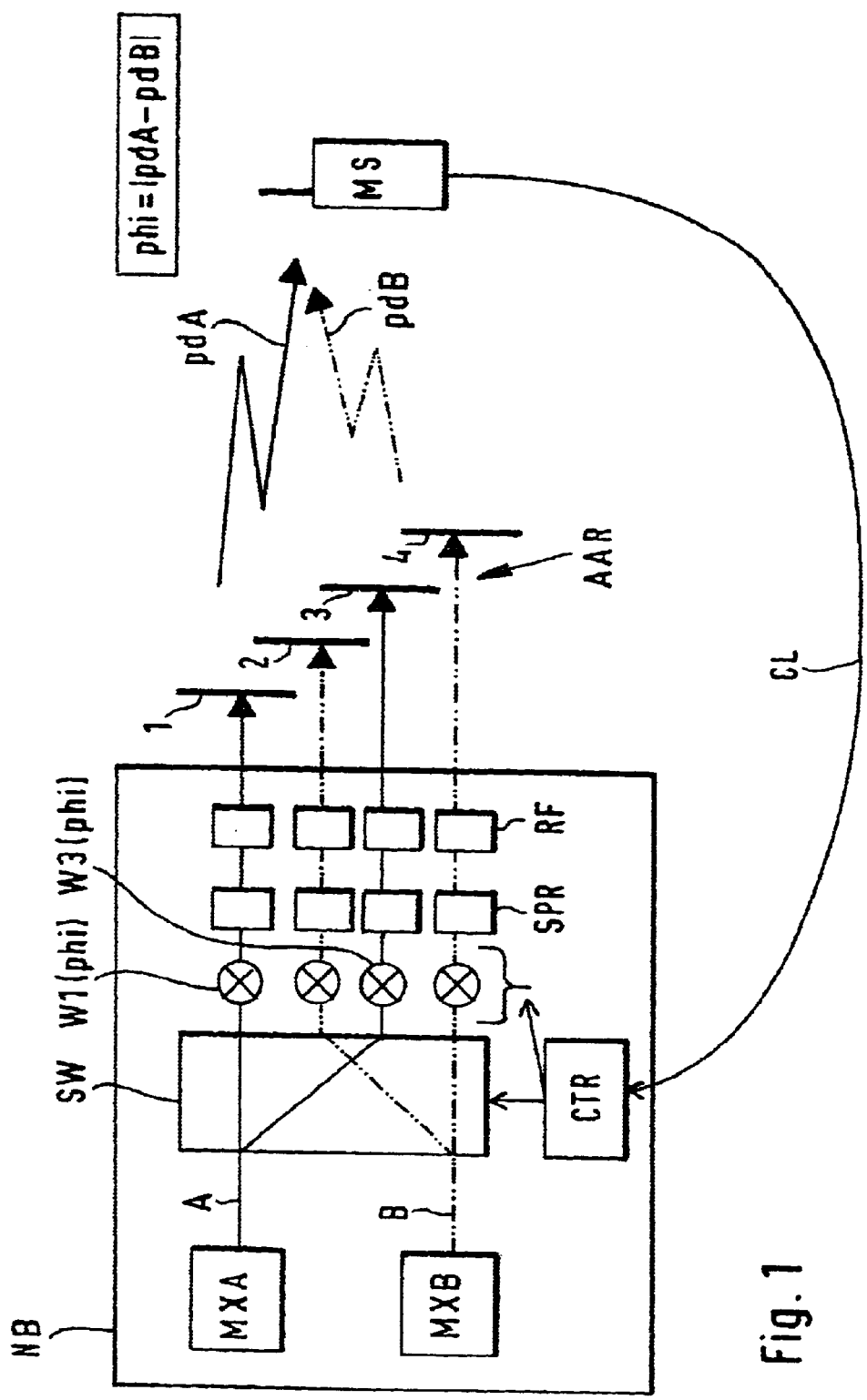
FIG. 1 shows schematically the structure of a mobile radio system with a base station according to the invention.

FIG. 1 shows the structure of a mobile radio system with a base station NB and a mobile station MS. The base station is connected to an antenna array AAR consisting of four antennas 1, 2, 3, and 4. The antenna array AAR radiates signals by the diversity transmission method described below. To that end, the base station includes a first transmitting means MXA and a second transmitting means MXB which create a first signal A and a second signal B from a transmission signal. The two signals A and B differ in their identifications. In this example, the transmission signal is a CDMA signal, and two different, mutually orthogonal pilot sequences are used as identifications. The transmitting means MXA and MXB are multiplexers, one of which adds the first pilot sequence to produce the first signal A, while the other adds the second pilot sequence to produce the second signal B. According to the invention, these two signals A and B are then fed to the antenna array AAR in such a manner that they are radiated via different antennas and transmitted over different radio paths on the diversity principle.

To feed the signals A and B to the antenna array AAR, the base station includes assignment means SW which can connect each of the two transmitting means MXA and MXB to each of the antennas 1 to 4. The base station further includes computing and control means CTR which are connected to the assignment means and control the latter to assign each antenna to one of the transmitting means. In the example shown in FIG. 1, antennas 1 and 3 are connected to the first transmitting means MXA, and antennas 2 and 4 are connected to the second transmitting means MXB. The establishment of these connections is freely selectable and is effected in accordance with a division of the antennas 1 to 4 into two different antenna groups, which is described below. In FIG. 1, antennas 1 and 3 form a first antenna group, and antennas 2 and 4 a second antenna group.

The base station NB further includes complex weighting stages which are inserted in the antenna branches and which each set the amplitude and phase of the signal radiated by the respective antenna. These complex weighting stages, such as the weighting stages W1 and W3 shown in FIG. 1, are also controlled by the computing and control means CTR. The base station NB further includes stages SPR following the weighting stages for spreading the signals by means of channelization codes and scrambling codes. These stages SPR are followed by radio-frequency stages RF which convert the signals from the baseband to the transmission band. FIG. 1 shows, as an example of a plurality of transmission channels, the block diagram for one transmission channel.

In the embodiment shown in FIG. 1, the first signal A is transmitted by the first antenna group, consisting of antennas 1 and 3, and the. second signal B by the second antenna group, consisting of antennas 2 and 4. To the mobile station MS, which is located in the far field of the antenna array AAR, the radiation of the two signals A and B via the two antenna groups does not differ from radiation via two conventional diversity antennas. This means that the mobile station MS receives the two signals A and B essentially via two different paths which have different losses and different signal delays pdA and pdB. These differences manifest themselves at the receiving end as an amplitude difference and a phase difference. To simplify the illustration, FIG. 1 shows only the phase difference phi which exists between the two signals A and B at the receiver. Only if this phase difference is zero or approximately zero can a sufficient diversity gain be achieved on reception of the two signals. Compared with a conventional diversity transmission arrangement, an additional diversity gain of about 6 dB is achieved here using four antennas. The mobile station MS communicates the determined phase difference phi in the form of a correction signal to the base station NB, whose controller CTR then causes the phase position to be changed in those complex weighting stages W1 and W3 which are connected to one of the antenna groups (here the antenna group consisting of antennas 1 and 3). A closed loop CL is thus established via the mobile station. In this example, the phase position for the first antenna group, i.e., for antennas 1 and 3, is changed in response to the correction signal. When this correction process has been completed, new antenna groups are formed and the correction process is repeated using these new antenna groups. The new first antenna group is then formed by antennas 1 and 4, for example, and the new second group by antennas 2 and 3. In this manner, the correction process is cycled through several times.

Figure 2:
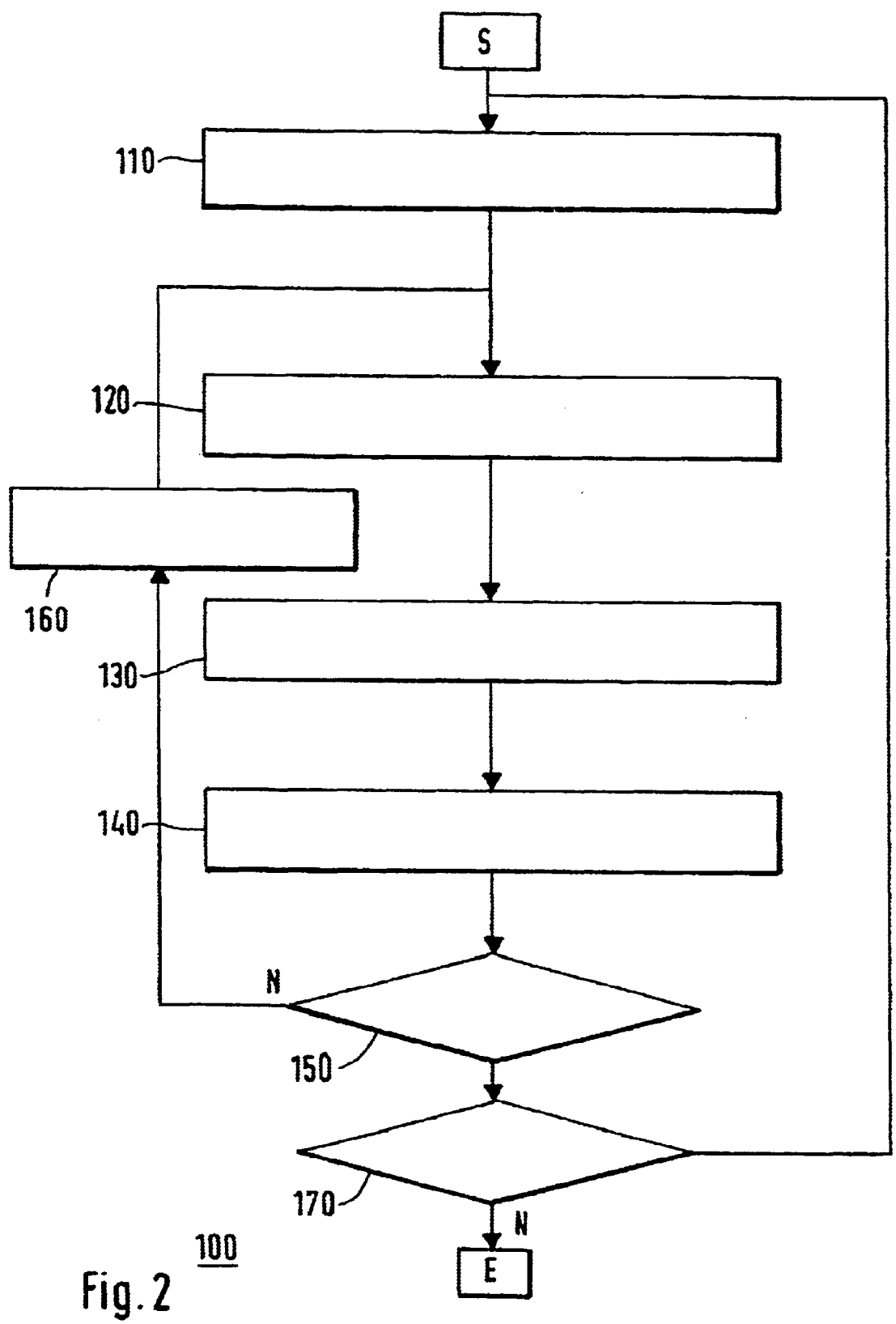
FIG. 2 is a flowchart showing the steps of the method according to the invention.

FIG. 2 is a flowchart showing the steps of the diversity transmission method according to the invention, 100, which is carried out by the base station and mobile station described above with reference to FIG. 1. In the following, reference will be made to these two FIGS. 1 and 2.

The method 100 comprises steps 110 to 170 and begins after the start S with a first step 110, which is performed by the base station. In this first step 110, the computing and control means of the base station divide the antennas into two antenna groups. The first antenna group consists of antennas 1 and 3, and the second antenna group of antennas 2 and 4.

In a second step 120, the first antenna group is connected to the first transmitting means and second antenna group to the second transmitting means, as is shown in FIG. 1. As a result, the first antenna group, i.e., antennas 1 and 3, transmits the first signal A, and the second antenna group, i.e., antennas 2 and 4, transmits the second signal B.

In a next step 130, the signals A and B are received by the mobile station MS. As the two signals arrive over different transmission paths, besides a negligible amplitude difference, a nonnegligible phase difference phi exists between the two received signals. This phase difference is determined by the mobile station MS.

In a next step 140, the mobile station MS communicates this phase difference to the base station NB, which then changes the phase position for the first antenna group, i.e., for antennas 1 and 3. The signals A and B transmitted after the phase correction can then be received by the mobile station MS and be constructively combined to achieve a diversity gain.

In a next step 150, a check is made to see whether the correction process is to be performed once more using two antenna groups. The criterion used for this check is the number N which indicates how often antenna groups have already been formed, i.e., how many groupings have been made. Since a total of four antennas 1 to 4 are used, up to three different groupings are possible, namely:

(a) antenna groups (1, 3) and (2, 4);

(b) antenna groups (1, 4) and (2, 3); and (c) antenna groups (1, 2) and (3, 4).

In this example, only one grouping has been made, namely grouping (a) in step 110. Therefore, it is decided in step 150 to make another grouping. To that end, a branch is made to a next step 160, in which two new antenna groups, namely antenna group (1, 4) and (2, 3) according to grouping (b), are formed. After that, steps 120 to 140 for correcting the amplitude and phase are performed again. Then, in step 150, it is again determined how many different groupings have been made. In this example, two of three possible groupings have been made, so that steps 160 and 120 to 140 will be cycled through for a last time, with the antennas now being grouped in step 160 according to grouping (c). Thus, two different antenna groups were formed three times (N=3) and used to correct the amplitudes and phase positions.

This is followed by step 170, in which a check is made to see whether the transmission quality has changed as a result of movements of the mobile stations. If that is the case, the whole process should be repeated beginning with 110; otherwise the process can be terminated. The method 100 thus comprises an outer cycle with steps 110 to 170 and an inner cycle with steps 120 to 160.

The inner cycle need not necessarily be passed through until all possible groupings were used for correction. It may suffice to pass through a limited number of cycles which is sufficient to achieve a sufficient diversity gain. This is illustrated in FIG. 3.

Figure 3:
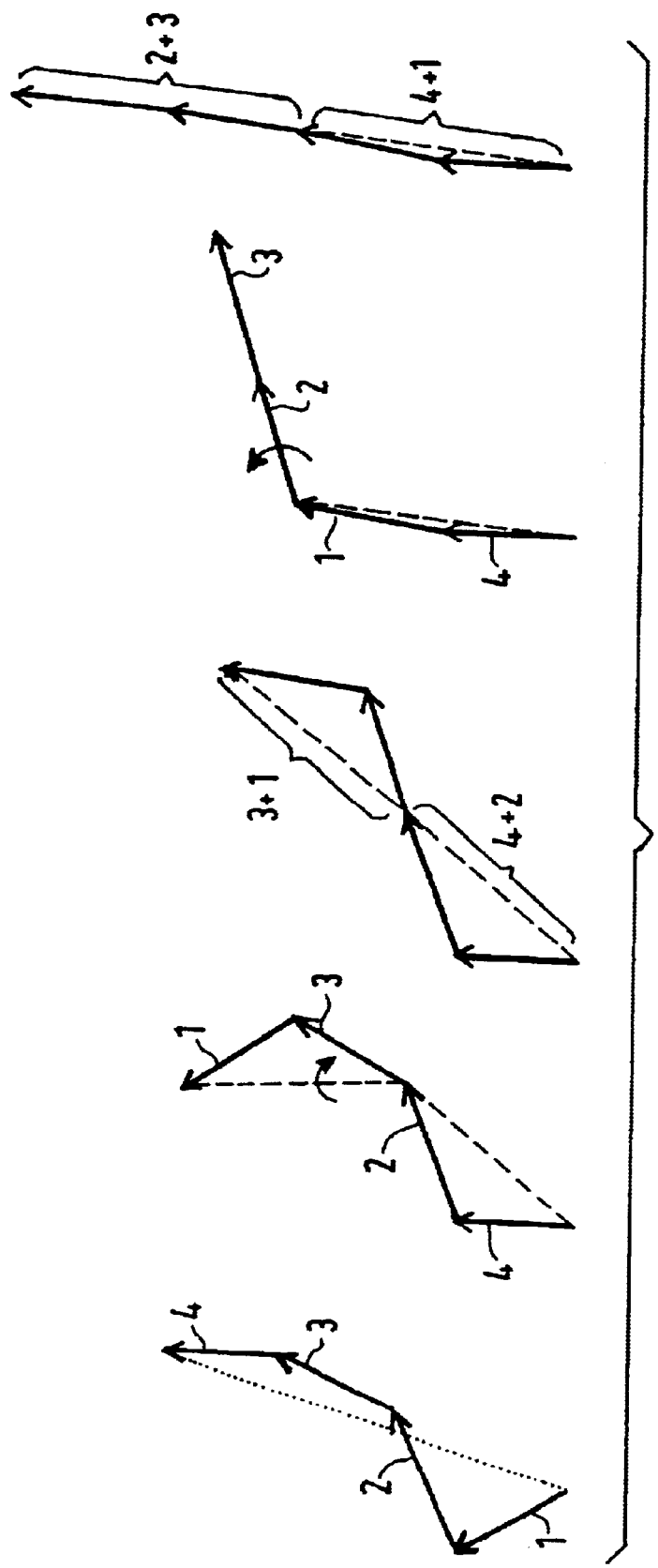
FIG. 3 illustrates, with the aid of vectors, the signal improvement obtained by the method.

FIG. 3 is divided into five parts which each represent a snapshot in the course of the process. The arrangement of the parts, which is to be viewed from left to right, reflects the time sequence of the snapshots. Each part of the figure shows four vectors, which each represent the transfer function of a respective one of the four transmission paths (see also FIG. 1): Vector 1 stands for the transmission path from antenna 1 to mobile station MS, vector 2 stands for the transmission path from antenna 2 to mobile station MS, etc.

Because of the different propagation conditions on the individual transmission paths, vectors 1 to 4 differ in amplitude and phase. This is represented by the different lengths and orientations of the vectors. The individual vectors 1 to 4 combine at the receiving location, i.e., at the receiver of the mobile station, to form a resultant which corresponds to the overall transfer function of the diversity radio channel. The more constructively the individual vectors 1 to 4 combine, i.e., the longer the resultant, the higher the diversity gain. By the above-described method, the phase positions at the antennas are adjusted relative to each other in such a way that the individual vectors 1 to 4 assume the same orientation and that the resultant becomes as long as possible. This process is illustrated in FIG. 3, which shows the step-by-step correction of the phase positions.

The leftmost part of the figure shows the initial situation, in which the antennas have not yet been adjusted relative to each other, so that the individual vectors 1 to 4 occupy widely differing phase positions. Accordingly, the resultant (dotted line) is substantially shorter than the sum of the lengths of the individual vectors 1 to 4. Thus, the combination of the individual vectors is far from optimal and needs to be improved. Therefore, according to the invention (see steps 110 to 140 in FIG. 2), a first antenna group, consisting of antennas 3 and 1, and a second antenna group, consisting of antennas 4 and 2, are formed. This measure is illustrated in the next part of the figure by the grouping of vectors 4, 2, 3, and 1 and by the sum vectors 4+2 and 3+1 (broken lines). Then, the phase position of the sum vector 3+1, i.e., the phase position for the first antenna group, is changed so that the two sum vectors have the same orientation. As shown in the third part of the figure, the vectors now combine to form a resultant which is already slightly longer than the vector shown at the beginning. The first grouping and the subsequently performed correction of the phase positions are complete and an additional diversity gain has already been achieved, which is indicated by the increase in the length of the resultant.

The process is now continued with a new, second grouping (see also step 160 in FIG. 2). A new first antenna group, consisting of antennas 4 and 1, and a new second antenna group, consisting of antennas 3 and 2, are formed. This measure is shown in the fourth part of the figure by the grouping of the vectors 4, 1, 2, and 3 and by the sum vectors 4+1 and 2+3 (broken lines). Then, the phase position for the new first antenna group is changed, i.e., vectors 2 and 3 are rotated, so that the sum vectors 4+1 and 2+3 have the same orientation (see also steps 120 to 140 in FIG. 2).

As is apparent from the rightmost part of the figure, a resultant is obtained whose length is nearly equal to the sum of the lengths of all vectors 1 to 4. Accordingly, the antennas have been adjusted relative to each other nearly optimally. Nearly the maximum possible diversity gain is achieved, and the process could be terminated. Also, all possible antenna groups could be formed and the one with the highest diversity gain could be selected.

With reference to FIGS. 1 and 2, each new formation of antenna groups in step 160 means that the assignment means SW establish new connections from the first transmitting means MXA to the antennas 1 and 4. The assignment means may contain, for example, a switching matrix with two inlets and four outlets.

As a result of the different groupings, with each cycle, the signals A and B are transmitted via new antenna groups. With each cycle, the mobile station MS, which receives the signals, determines a new phase difference, which is likely to differ from the previously determined phase difference. This new phase difference, too, is communicated to the base station, which then sets the phase position for one of the two antenna groups anew. In like manner, the amplitude can be set for the antenna group. With each cycle, a new amplitude and phase correction is performed on the antenna array and the diversity gain is increased.

In the example described, using a total of four antennas, three different groupings are possible, namely the grouping "1 with 3 and 2 with 4", the grouping "1 with 4 and 2 with 3", and the grouping "1 with 2 and 3 with 4". The process described can thus be repeated three times in order to increase the diversity gain. With a greater number of antennas, a significantly greater number of cycles is possible. If a large number of antennas are used, it is advantageous to form the antenna groups with the aid of a so-called Walsh-Hadamard matrix. If the number of antennas used is a power to two, i.e., $M=2^N$, a symmetric Walsh-Hadamard matrix consisting of M×M elements can be formed, with each of the columns being assigned to a respective one of the M antennas, and the rows indicating which of the two antenna groups the respective antenna is assigned to. If eight antennas are used (M=8), the Walsh-Hadamard matrix H looks as follows:

$$H = \begin{bmatrix} & 1 & 2 & 3 & 4 & 5 & 6 & 7 & 8 & \\ \rightarrow & +1 & +1 & +1 & +1 & +1 & +1 & +1 & +1 & \\ & +1 & -1 & +1 & -1 & +1 & -1 & +1 & -1 & \leftarrow \\ & +1 & +1 & -1 & -1 & +1 & +1 & -1 & -1 & \\ & +1 & -1 & -1 & +1 & +1 & -1 & -1 & +1 & \\ & +1 & +1 & +1 & +1 & -1 & -1 & -1 & -1 & \\ & +1 & -1 & +1 & -1 & -1 & +1 & -1 & +1 & \\ & +1 & +1 & -1 & -1 & -1 & -1 & +1 & +1 & \\ & +1 & -1 & -1 & +1 & -1 & +1 & +1 & -1 & \end{bmatrix}$$

The rows of the matrix represent 8-bit Walsh-Hadamard codes. First, the columns are assigned to the antennas, i.e., column 1 is assigned to antenna 1, column 2 to antenna 2, column 3 to antenna 3, etc. Then, those rows which follow the first row are evaluated. Each row indicates one grouping, the symbol +1 signifying membership of group A and the symbol −1 signifying membership of group B. Row 2, for example, indicates the following grouping: The first antenna group comprises antennas 1, 3, 5, and 7, and the second antenna group comprises antennas 2, 4, 6, and 8. By means of the Walsh-Hadamard matrix, antenna groups are formed from the eight antennas seven times, i.e., only M−1 combinations are selected, i.e., far less than the number of possible combinations. Since the Walsh-Hadamard matrix contains M−1 orthogonal row vectors, the M−1=7 different combinations (antenna groups) are uncorrelated. Thus, the antenna array is represented by the small number of antenna groups in the best possible manner.

The invention is particularly suited for use in a CDMA mobile radio system, because such a system already includes means by which the signals to be transmitted can be provided with different pilot sequences. If base stations according to the invention are equipped with phased arrays, transmission can take place in the SDMA (space division multiple access) mode.

What is claimed is:

1. A diversity transmission method that creates, from a transmission signal, a first signal with a first identification and a second signal with a second identification which are transmitted via a plurality of spaced antennas, wherein the method further comprises:
   dividing the plurality of antennas into a first antenna group and a second antenna group,
   transmitting the first signal via the first antenna group and the second signal via the second antenna group,
   redividing the plurality of antennas into a new first antenna group and a new second antenna group, and
   retransmitting the first signal via the new first antenna group and the second signal via the new second antenna group, wherein the redivision of the plurality of antennas into new groups and the retransmission of the first and second signals via the new antenna groups is repeated until the total number of antenna groups equals a predetermined number.

2. The diversity transmission method as claimed in claim 1, wherein the predetermined number of antenna groups is the maximum number of possible antenna groups.

3. A diversity transmission method that creates, from a transmission signal, a first signal with a first identification and a second signal with a second identification which are transmitted via a plurality of spaced antennas, wherein the method further comprises:
   dividing the plurality of antennas into a first antenna group and a second antenna group,
   transmitting the first signal via the first antenna group and the second signal via the second antenna group,
   redividing the plurality of antennas into a new first antenna group and a new second antenna group, and
   retransmitting the first signal via the new first antenna group and the second signal via the new second antenna group,
   receiving the first and second signals and determining an amplitude difference and/or a phase difference existing between the two signals, and
   communicating the amplitude difference and/or phase difference to the transmitting location, where the amplitude and/or the phase position for one of the two antenna groups are changed.

4. The diversity transmission method as claimed in claim 3, wherein the amplitude and/or the phase position for one of the two antenna groups are changed by complex weighting.

5. A diversity transmission method that creates, from a transmission signal, a first signal with a first identification and a second signal with a second identification which are transmitted via a plurality of spaced antennas, wherein the method further comprises:
   dividing the plurality of antennas into a first antenna group and a second antenna group,
   transmitting the first signal via the first antenna group and the second signal via the second antenna group,
   redividing the plurality of antennas into a new first antenna group and a new second antenna group, and
   retransmitting the first signal via the new first antenna group and the second signal via the new second antenna group, wherein the number of antennas is equal to M, where the number M is a power of two, and for the division of the M antennas into two antenna groups, a Walsh-Hadamard matrix comprising M×M elements is formed having M columns assigned to a respective one of the M antennas, and having M rows, those M−1 rows which follow the first row each indicate an assignment of the antennas to one of the two antenna groups, so that M−1 different groupings are possible, and that the predetermined value for the number of antenna groups formed is equal to 2 times M−1.

6. A diversity transmission method that creates, from a transmission signal, a first signal with a first identification and a second signal with a second identification which are transmitted via a plurality of spaced antennas, wherein the method further comprises:
   dividing the plurality of antennas into a first antenna group and a second antenna group,
   transmitting the first signal via the first antenna group and the second signal via the second antenna group,
   redividing the plurality of antennas into a new first antenna group and a new second antenna group, and
   retransmitting the first signal via the new first antenna group and the second signal via the new second antenna group, wherein the division of the plurality of antennas and transmission of the first and second signals is repeated if the transmission quality of the first and second signals falls below a predetermined value.

7. A base station for a mobile radio system that is connected to a plurality of spaced antennas for diversity transmitting, the base station comprising:
   a first transmitting means and a second transmitting means that create, from a transmission signal, a first signal with a first identification and a second signal with a second identification, respectively, wherein the base station transmits the two signals via the spaced antennas, assignment means for assigning each of the antennas to either the first or second transmitting means, and computing and control means connected to the assignment means, wherein the computing and control means divide the plurality of antennas into a first antenna group and a second antenna group, command the first transmitting means to transmit the first signal via the first antenna group and the second transmitting means to transmit the second signal via the second antenna group, redivide the plurality of antennas into a new first antenna group and a new second antenna group, and command the first transmitting means to transmit the first signal via the new first antenna group and the second transmitting means to transmit the second signal via the new second antenna group, wherein the division of the plurality of antennas into new groups and the transmission of the first and second signals via the new antenna groups is repeated until the total number of antenna groups equals a predetermined number.

8. The base station as claimed in claim 7, wherein the predetermined number of antenna groups is the maximum number of possible antenna groups.

9. The base station as claimed in claim 7, wherein the plurality of antennas is a phased array.

10. A base station for a mobile radio system that is connected to a plurality of spaced antennas for diversity transmitting, the base station comprising:

a first transmitting means and a second transmitting means that create, from a transmission signal, a first signal with a first identification and a second signal with a second identification, respectively, wherein the base station transmits the two signals via the spaced antennas, assignment means for assigning each of the antennas to either the first or second transmitting means, and computing and control means connected to the assignment means, wherein the computing and control means divide the plurality of antennas into a first antenna group and a second antenna group, command the first transmitting means to transmit the first signal via the first antenna group and the second transmitting means to transmit the second signal via the second antenna group, redivide the plurality of antennas into a new first antenna group and a new second antenna group, and command the first transmitting means to transmit the first signal via the new first antenna group and the second transmitting means to transmit the second signal via the new second antenna group, wherein the base station changes the amplitude and/or the phase position for one of the two antenna groups based on an amplitude difference and/or a phase difference information transmitted back from a receiving location.

11. The base station as claimed in claim 10, the base station further comprising complex weighting stages connected to the computing and control means and which change the amplitudes and phases of the signals transmitted via one of the antenna groups in response to control signals provided by the computing and control means.

12. The base station as claimed in claim 10, wherein the plurality of antennas is a phased array.

13. A base station for a mobile radio system that is connected to a plurality of spaced antennas for diversity transmitting, wherein the number of spaced antennas is equal to M, where the number M is a power of two, the base station comprising:

a first transmitting means and a second transmitting means that create, from a transmission signal, a first signal with a first identification and a second signal with a second identification, respectively, wherein the base station transmits the two signals via the spaced antennas, assignment means for assigning each of the antennas to either the first or second transmitting means, and computing and control means connected to the assignment means, wherein the computing and control means divide the plurality of antennas into a first antenna group and a second antenna group, command the first transmitting means to transmit the first signal via the first antenna group and the second transmitting means to transmit the second signal via the second antenna group, redivide the plurality of antennas into a new first antenna group and a new second antenna group, and command the first transmitting means to transmit the first signal via the new first antenna group and the second transmitting means to transmit the second signal via the new second antenna group, wherein when the computing and control means divides the M antennas into two antenna groups, a Walsh-Hadamard matrix comprising M×M elements is formed having M columns assigned to a respective one of the M antennas, and having M rows, those M−1 rows which follow the first row each indicate an assignment of the antennas to one of the two antenna groups, so that M−1 different groupings are possible, and that the predetermined value for the number of antenna groups formed is equal to 2 times M−1.

14. A base station for a mobile radio system that is connected to a plurality of spaced antennas for diversity transmitting, the base station comprising:

a first transmitting means and a second transmitting means that create, from a transmission signal, a first signal with a first identification and a second signal with a second identification, respectively, wherein the base station transmits the two signals via the spaced antennas, assignment means for assigning each of the antennas to either the first or second transmitting means, and computing and control means connected to the assignment means, wherein the computing and control means divide the plurality of antennas into a first antenna group and a second antenna group, command the first transmitting means to transmit the first signal via the first antenna group and the second transmitting means to transmit the second signal via the second antenna group, redivide the plurality of antennas into a new first antenna group and a new second antenna group, and command the first transmitting means to transmit the first signal via the new first antenna group and the second transmitting means to transmit the second signal via the new second antenna group, wherein the division of the plurality of antennas and transmission of the first and second signals is repeated if the transmission quality of the first and second signals falls below a predetermined value.

15. A base station for a mobile radio system that is connected to a plurality of spaced antennas for diversity transmitting, the base station comprising:

a first transmitter and a second transmitter that create, from a transmission signal, a first signal with a first identification and a second signal with a second identification, respectively, wherein the base station transmits the two signals via the spaced antennas, a switch for assigning each of the antennas to either the first or second transmitter, and a controller connected to the switch, wherein the controller divides the plurality of antennas into a first antenna group and a second antenna group, commands the first transmitter to transmit the first signal via the first antenna group and the second transmitter to transmit the second signal via the second antenna group, redivides the plurality of antennas into a new first antenna group and a new second antenna group, and commands the first transmitter to transmit the first signal via the new first antenna group and the second transmitter to transmit the second signal via the new second antenna group, wherein the division of the plurality of antennas into new groups and the transmission of the first and second signals via the new antenna groups is repeated until the total number of antenna groups equals a predetermined number.

16. A base station for a mobile radio system that is connected to a plurality of spaced antennas for diversity transmitting, the base station comprising:

a first transmitter and a second transmitter that create, from a transmission signal, a first signal with a first identification and a second signal with a second identification, respectively, wherein the base station transmits the two signals via the spaced antennas, a switch for assigning each of the antennas to either the first or second transmitter, and a controller connected to the switch, wherein the a controller divides the plurality of antennas into a first antenna group and a second antenna group, commands the first transmitter to transmit the first signal via the first antenna group and the second transmitter to transmit the second signal via the second antenna group, redivides the plurality of antennas into a new first antenna group and a new second antenna group, and commands the first transmitter to transmit the first signal via the new first antenna group and the second transmitter to transmit the second signal via the new second antenna group, wherein the base station changes the amplitude and/or the phase position for one of the two antenna groups based on an amplitude difference and/or a phase difference information transmitted back from a receiving location.

17. A base station for a mobile radio system that is connected to a plurality of spaced antennas for diversity transmitting, wherein the number of spaced antennas is equal to M, where the number M is a power of two, the base station comprising:

a first transmitter and a second transmitter that create, from a transmission signal, a first signal with a first identification and a second signal with a second identification, respectively, wherein the base station transmits the two signals via the spaced antennas, a switch for assigning each of the antennas to either the first or second transmitter, and a controller connected to the switch, wherein the controller divides the plurality of antennas into a first antenna group and a second antenna group, commands the first transmitter to transmit the first signal via the first antenna group and the second transmitter to transmit the second signal via the second antenna group, redivides the plurality of antennas into a new first antenna group and a new second antenna group, and commands the first transmitter to transmit the first signal via the new first antenna group and the second transmitter to transmit the second signal via the new second antenna group, wherein when the controller divides the M antennas into two antenna groups, a Walsh-Hadamard matrix comprising M×M elements is formed having M columns assigned to a respective one of the M antennas, and having M rows, those M−1 rows which follow the first row each indicate an assignment of the antennas to one of the two antenna groups, so that M−1 different groupings are possible, and that the predetermined value for the number of antenna groups formed is equal to 2 times M−1.

18. A base station for a mobile radio system that is connected to a plurality of spaced antennas for diversity transmitting, the base station comprising:

a first transmitter and a second transmitter that create, from a transmission signal, a first signal with a first identification and a second signal with a second identification, respectively, wherein the base station transmits the two signals via the spaced antennas, a switch for assigning each of the antennas to either the first or second transmitter, and a controller connected to the switch, wherein the controller divides the plurality of antennas into a first antenna group and a second antenna group, commands the first transmitter to transmit the first signal via the first antenna group and the second transmitter to transmit the second signal via the second antenna group, redivides the plurality of antennas into a new first antenna group and a new second antenna group, and commands the first transmitter to transmit the first signal via the new first antenna group and the second transmitter to transmit the second signal via the new second antenna group, wherein the division of the plurality of antennas and transmission of the first and second signals is repeated if the transmission quality of the first and second signals falls below a predetermined value.

* * * * *